March 21, 1967
M. A. ROWDEN
3,310,345
TRAILER
Filed Dec. 7, 1964
2 Sheets-Sheet 1
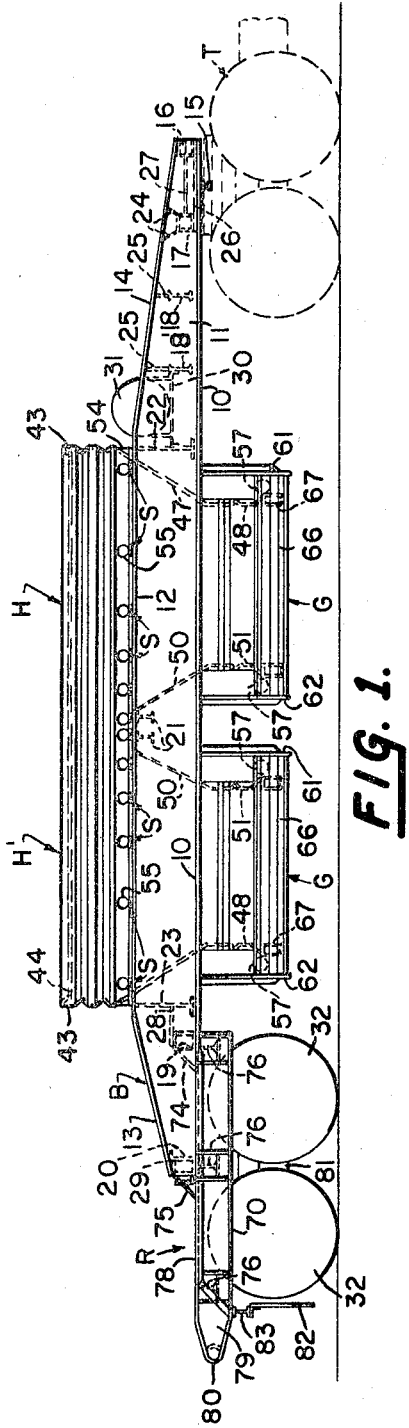
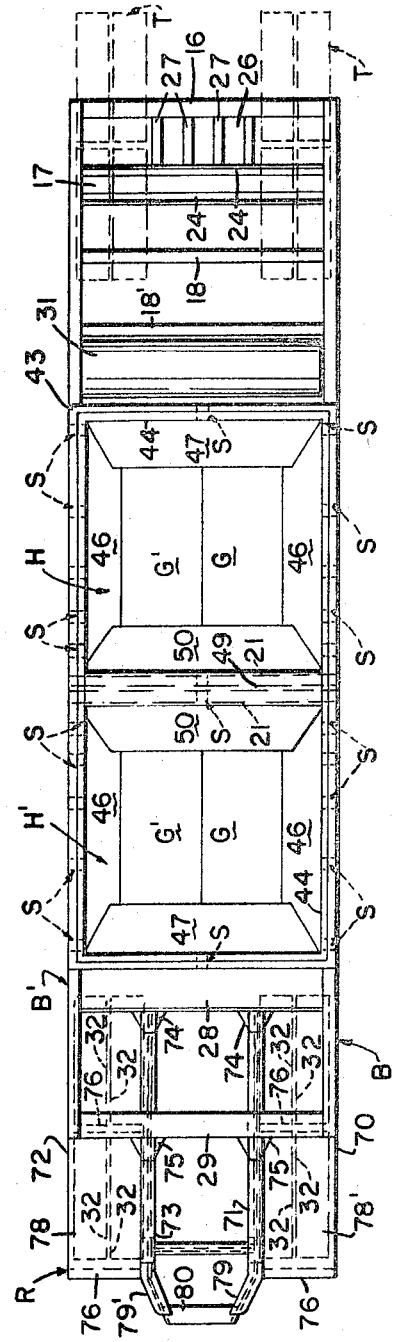
INVENTOR.
MYRON A. ROWDEN
BY
*Van Valkenburgh & Lowe*
ATTORNEYS March 21, 1967  M. A. ROWDEN  3,310,345
TRAILER
Filed Dec. 7, 1964  2 Sheets-Sheet 2
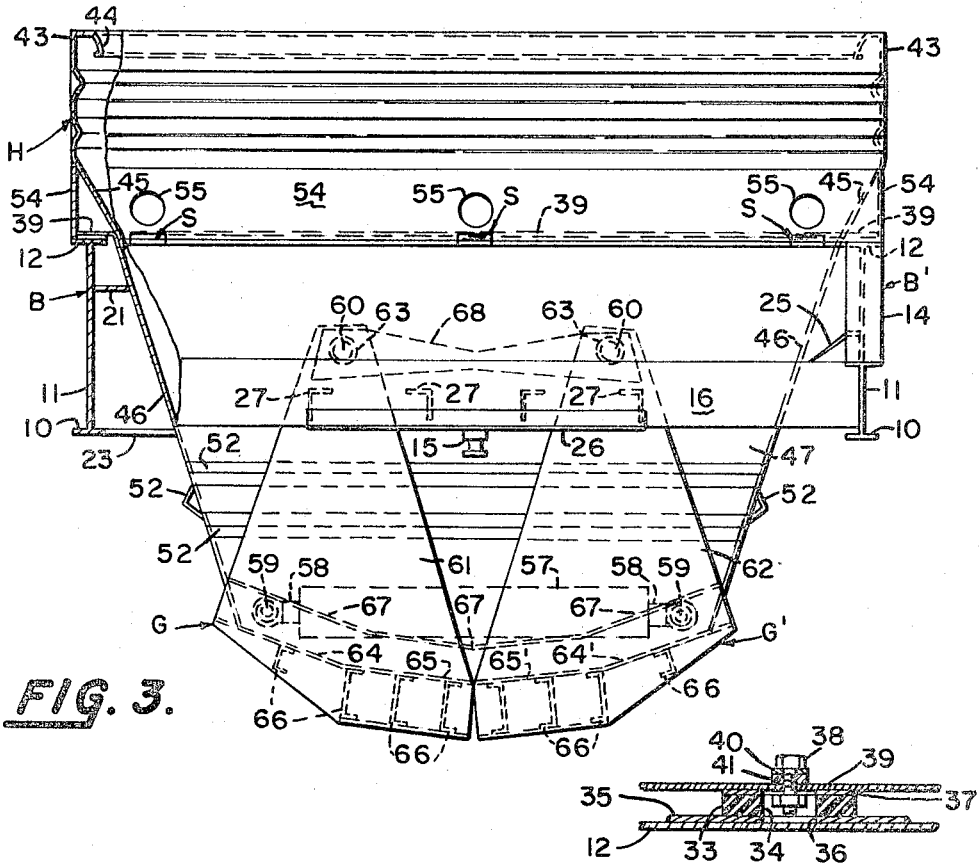
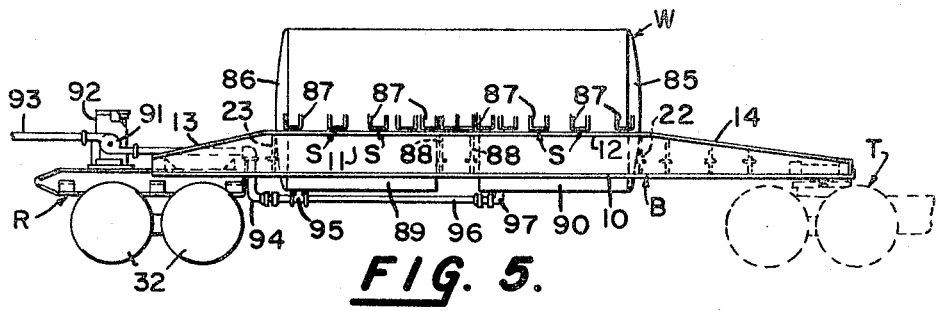
INVENTOR.
MYRON A. ROWDEN
BY
Van Valkenburgh & Lowe
ATTORNEYS

United States Patent Office 3,310,345
Patented Mar. 21, 1967

3,310,345
TRAILER
Myron A. Rowden, Broomfield, Colo., assignor, by mesne assignments, to Timpte, Inc., Denver, Colo., a corporation of Colorado
Filed Dec. 7, 1964, Ser. No. 416,517
8 Claims. (Cl. 298—35)

This invention relates to trailers, and more particularly to trailers constructed to minimize deflections due to load in a hopper, tank or the like.

The conventional trailer is provided with trusses to support a hopper, tank or the like, but this arrangement, in many instances, places undue stresses on the hopper supported thereby, for instance, so that the doors do not open and close properly. Also, the stresses due to loading and unloading the trailer may result in stress failures of parts, requiring extensive repairs.

Among the objects of this invention are to provide a novel trailer; to provide such a trailer which is adapted to utilize inverted beams; to provide such a trailer which is adapted to utilize shock absorbers; to provide such a trailer in which the shock absorbers are spaced to compensate for bending and thus may all be of equal size; to provide such a trailer in which the beams are precambered upwardly, so that deflection at the center below the centerline is approximately equal to the cambered position above the centerline; to provide such a trailer in which the stresses due to deflection of the beams are substantially prevented from being transmitted to the trailer load, such as one or more hoppers; to provide such a trailer which may be utilized for many purposes; and to provide such a trailer which is of relatively simple construction and economical to manufacture.

Additional objects and the novel features of this invention will become apparent from the description which follows, taken in conjunction for the accompanying drawings, in which:

FIG. 1 is a side elevation of a trailer of this invention, having a dual hopper mounted thereon supported by shock absorbers and precambered, inverted beams;

FIG. 2 is a top plan view of the trailer of FIG. 1;

FIG. 3 is a front elevation, on an enlarged scale, of the trailer of FIG. 1, with the rear bogie omitted and a fragmentary section at a hopper being shown at the left side, for clarity of illustration;

FIG. 4 is a further enlarged, vertical section of one of the shock absorbers; and FIG. 5 is a fragmentary, side elevation of the trailer, but showing a water tank mounted thereon.

In accordance with this invention, the trailer of FIGS. 1 and 2 includes a pair of laterally spaced, inverted I-beams B and B', which form the longitudinal load-bearing members and each of which comprises a lower flange 10, a trapezoidal web 11, a center upper flange 12 and outwardly and downwardly inclined top flanges 13 and 14 at opposite ends. The front end of the trailer is provided with a depending king pin 15, adapted to engage the so-called fifth wheel of a conventional tractor T, the rear dual wheel assembly of which is indicated in dotted lines, while the rear end of the trailer is supported by a rear bogie assembly R, which will be described later. Beams B and B' support between them duel hoppers H and H', which are conveniently connected together and will also be described later, while the beams are reinforced transversely in a suitable manner, as by a front pair of box beams 16 and 17, a front pair of I-beams 18 and 18', a rear pair of box beams 19 and 20, all extending between the lower portions of the beams B and B', a pair of center I-beams 21, which extend between the upper portions of beams B and B', and a pair of transverse hopper-supporting I-beams 22 and 23, which extend between the center upper flanges 12 and lower flanges 10 and the upper and lower edges of which are flush therewith. Front box beam 17 is reinforced by outwardly inclined gussets 24 above the same and beams 18 and 18' by gussets 25 above and at each end of the same, while front box beams 16 and 17 carry a plate 26 reinforced by channels 27, as in FIG. 3, king pin 15 being conveniently mounted on the underside of plate 26. An apron 28 extends rearwardly from beam 23 over box beam 19, while an apron 29 extends over box beam 20, each of aprons 28 and 29 extending the full width between beams B and B', as in FIG. 2. Also, a plate 30 may be mounted between beams 18' and 22, on which an air tank 31 is mounted, to insure an adequate supply of compressed air for operating gates G which close the lower ends of hoppers H and H'. Tank 31 may be mounted on the underside of center beams 21, if desired, or two air tanks may be utilized, one mounted between beam 22 and the front end of hopper H and the other mounted between beam 23 and the rear end of hopper H'. The various reinforcing beams are conveniently assembled and attached to beams B and B' by welding, which welding is also conveniently used to attach the reinforcing plates and gussets.

In accordance with this invention, the dual hoppers H and H' are supported by a plurality of shock absorbers S, one or more of which, such as three, are mounted on the transverse beams 22 and 23, as in FIG. 3, and a plurality of which are mounted on the beams B and B', being spaced along the upper flange 12 of each beam, so that each shock absorber will absorb a deflection of approximately the same amount upon full loading of the beams, thereby minimizing the stresses due to deflection of the beam being transmitted to the hopper. This spacing approaches, as far as practicable, a spacing in which each shock absorber is spaced the square of the distance from the longitudinal center of the beam as the next preceding shock absorber closer to the center of the beam, since the beams will deflect under load in the shape of a parabola. Thus, the theoretical spacing of the shock absorbers, with two shock absorbers side by side at the center of the beam, would, for instance, be one unit of distance from the next shock absorbers at each side of center, two units for the next, four units for the next, eight units for the next, and so on, it being understood that a unit of distance may, for instance, be one foot or less. Since the total number of shock absorbers necessary to support the load is normally greater than that which the length of the support would accommodate, if spaced in the above ratio, then an approximation must be utilized in order to install all of the shock absorbers in the necessary space. Thus, the distance may be as shown in the drawings, in which the distance between adjacent shock absorbers increases from the center to each end of the hoppers H and H'.

Each shock absorber S, as in FIG. 4, includes a resilient block 33, as of rubber, or synthetic rubber, which is generally rectangular with a hole 34 in the center, and which may be in excess of one inch in thickness. Block 33 is attached to and between a larger rectangular base plate 35, provided with a central hole 36, and a rectangular top plate 37, through which a bolt 38 extends for attachment to a supporting flange 39 of hopper H or H'. The head of bolt 38 engages a metal washer 40, beneath which is a thick cushion washer 41, while base plate 35 is conveniently welded to the top of flange 12 of beam B or B', the larger size of base plate 35 permitting such welding without adverse heat effect on block 33. As will be evident, bolt 38 and its nut may move upwardly and downwardly in holes 34 and 36 without touching flange 12, as resilient block 33 is compressed. Also, flange 39 of the hopper may move upwardly to compress cushion washer 41, without detaching base plate 35 or top plate 37 from block 33. As will be evident, other types of shock absorbers will be found to be suitable.

In further accordance with this invention, each of the beams B and B' are precambered upwardly, such as about ¾ inch at the center for a load and weight of hopper of over 60 tons and a length of hopper of approximately 17 feet. Such cambering may be accomplished by cutting the upper edge of each web 11 of beams B and B', corresponding to upper flange 12, in a convex arc having a relatively long radius, and placing the parts of each beam in a suitable jig or fixture, so that the upper flange 12 may be forced downwardly onto the convex upper surface. After final assembly, when there is no load in the hopper, the four shock absorbers in the center will receive the entire load of the empty hoppers, while there will be a slight gap at the shock absorbers outwardly therefrom and on beams 22 and 23. However, when the hoppers are fully loaded, all of the shock absorbers will be loaded approximately equally, due to the fact that the beams B and B' will be deflected downwardly at the center the greatest amounts and for lesser amounts as the distance from the center increases. Thus, when fully loaded, the upper flange 12 should be horizontal or slightly concave, rather than convexly arcuate in an upward direction in the long radius arc described above. As will be evident, the cambering of the beams will reduce the amount of deformation which the shock absorbers S must counteract, so that the approximation of the "square of the distance" spacing, for practical reasons, should enable the shock absorbers further to minimize stresses transferred from the beams to the hopper H through deformation under load.

The hoppers H and H', although shown as two dual hoppers, may be a single hopper or two spaced, separate hoppers, but preferably include an upper wall 43 which extends around both the hoppers, the space enclosed by upper wall 43 thus being common to both hoppers. Wall 43 may be corrugated, as shown, and also provided with an inwardly and downwardly extending, inside rim 44, as in FIG. 3, for additional strength, while the lower portion 45 of upper wall 43 slants inwardly and sharply downwardly, the lower edge of which is welded to a lower side wall 46 of the hopper, from the upper end of which supporting flange 39 extends laterally outwardly. Lower side wall 46 extends sharply downwardly to gates G and G', on each side. At the front of hopper H and at the rear of hopper H', as in FIG. 1, the lower portion 45 of upper wall 43 extends downwardly to flange 39, which extends laterally at the upper end of an intermediate end wall 47, which in turn extends downwardly to a vertical lower end wall 48, in turn extending downwardly to gates G and G'. Hoppers H and H' are separated at the center by a land 49, as at the elevation of the upper flange 12 of beams B and B', as in FIG. 1, while beneath land 49, the pair of center I-beams 21 connect beams B and B'. Land 49 may be flat, as shown, or may be upwardly convex, such as triangular. At each side of land 49, an intermediate, sharply sloping, intermediate center wall 50 extends to a vertical, lower center wall 51, which in turn extends to gates G and G'. Lower side walls 46, lower end walls 48 and lower center walls 51 may be reinforced by horizontal angles 52 welded in facing position to the respective walls, as shown. As will be evident, the parts of hoppers H and H' are preferably attached together by welding.

A vertical apron 54 extends upwardly from the outer edge of the upper flange 12 of each beam and from the outer edges of beams 22 and 23, so that a ledge immediately beneath upper wall 43 will not collect stones or the like, during filling, to drop off later as the trailer is being pulled over a highway to its destination. The upper edge of apron 54 is welded to upper wall 43, as in FIG. 3, adjacent the upper end of lower portion 45 thereof. Also, apron 54 is provided with a series of access holes 55, each directly above a shock absorber S, to permit the latter to be welded in position during assembly. Access holes 55 also permit replacement of any shock absorber S which fails in service.

The gates G and G', for each hopper, are similar but complementary in construction, conveniently being of the generally conventional clam shell type and moved apart and together by a double acting air cylinder 57 and appropriate piston and piston rod 58, at each end of the respective hopper, as in FIGS. 1 and 3, the cylinder being connected to one pin 59 and the piston rod to the opposite pin 59. Thus, the gates are adapted to be opened a slight amount, as to feed crushed gravel or rock along a desired area as the trailer is moved along slowly, or to be opened wider for discharge of a windrow of crushed gravel, rock or the like. Each gate G and G' is pivoted at each upper end on a trunnion 60 mounted on the outside of the respective intermediate wall 47 or 50. At end plate 61 or 62, conveniently having ribs or flanges on the outside for additional strength and having diverging edges, is provided with a bearing 63 engaging the respective trunnions. As will be evident, the opposite end plates 61 and 62 of each gate G are similar but complementary in construction, while the end plate of gate G' facing an end plate 61 of gate G is similar to end plate 62 of gate G, and also vice versa. As in FIG. 3, the bottom of each gate G comprises a pair of angularly disposed plates 64 and 65, each of which slopes inwardly, and reinforced on the underside by a series of channels 66. Similarly, the bottom of each gate G' comprises a pair of inwardly sloping, angularly disposed plates 65' and 66', reinforced on the underside by channels 66. The lower edges of the lower end walls 47 and center walls 50 of the hoppers H and H' correspond in contour to the upper surfaces of plates 64, 65, 65' and 64' of gates G and G', while these lower edges may be reinforced by an outer box beam 67, indicated in dotted lines. The gates G and G' should also be adapted to be closed, to "bite off" the discharge, as when moving from one position to another. For this purpose, the gates G and G' may be connected at each upper end by a conventional linkage system 68, indicated only generally in dotted lines in FIG. 3, so that one gate will open before but close after the other gate, so that with the opposite gate already closed, the full force of air pressure in cylinder 57 will be exerted against the closing gate. It will be understood, of course, that the construction of the hoppers H and H' and the gates G and G' may be varied considerably, as long as a support similar in function to flange 39 is provided, i.e. for resting on the shock absorbers S.

The rear bogie assembly R may be constructed in any suitable or conventional manner, such as including an outer longitudinal I-beam 70 beneath beam B and an inner longitudinal I-beam 71 spaced therefrom on one side, and an outer longitudinal I-beam 72 beneath beam B' and an inner longitudinal I-beam 73 spaced therefrom, on the opposite side. Longitudinal beams 70 and 72 are attached, as by welding, to the underside of beams B and B', respectively, while longitudinal beams 71 and 73 are attached, as by welding to the underside of box beams 19 and 20, with reinforcing gussets 74 also connecting box beam 19 to I-beams 71 and 73 and gussets 75 connecting box beam 20 thereto, each pair of longitudinal beams 70, 71 and 72, 73 being reinforced by transverse I-beams 76 extending therebetween and welded thereto, with transverse beams 76 being spaced to prevent interference with the two sets of dual wheels 32 on each side. Adjacent but spaced from the rear ends thereof, a transverse I-beam 77 extends between inside beams 71 and 73 for additional reinforcement. The space between beams 70 and 71 may be closed by a top plate 78, which additionally reinforces the construction, with a similar top plate 78' closing the space between beams 72 and 73. The rear end 79 of beam 71 and 79' of beam 73 may bend inwardly and taper, as shown, to permit the mounting of a push bar 80 at the rear. A conventional bogie frame 81 is attached to the underside of the box beams 19 and 20 and I-beam 77, while a mud flap 82 may depend from a lower rear beam 83, as in FIG. 1. It will be understood, of course, that other constructions may be utilized for the rear bogie assembly R, either a substantially all welded construction as shown or of other suitable types.

An alternative embodiment is shown in FIG. 5, wherein the trailer supports a water tank W, as shown, rather than a hopper. As before, the trailer includes inverted beams B and B' and front and rear transverse beams similar to the trailer of FIGS. 1 and 2, as well as transverse beams 22 and 23 at the opposite ends of the water tank, although the tank, because of its preferably outwardly arcuate ends 85 and 86, is not supported by the latter. A series of U shaped supporting pads 87 are attached, preferably by welding, to each side of the tank for engagement with the respective shock absorbers S, which are attached to upper flange 12 of each beam B and B' in the same spaced relationship shown in FIGS. 1 and 2, i.e., with each shock absorber S spaced further apart from the center to each end of the tank. The shock absorbers S of FIG. 5 may be constructed as shown in FIG. 4, with the lower, horizontal flange of the pad 87 corresponding in position to the flange 39 of FIG. 4. It will be understood, of course, that other constructions of the shock absorbers may be used, as well as various other constructions of the beams. As will be evident, the water tank W is supported on the beams B and B' by shock absorbers S in a similar manner to the hopper H, so that stresses transmitted to water tank W by deflection of the beams will be minimized.

At the center, a pair of transverse I-beams 88 extend between the beams B and B' and, in order to clear beams 88, water tank W is conveniently provided with two lower sections 89 and 90, providing a space therebetween extending from just above the level of the upper edges of beams 88 to the lower edge of the tank, as by semicircular, concave heads for the inner end of each lower section 89 and 90 and an upwardly facing, concave plate (not shown) for closing the space between sections 89 and 90. A pump 91 and a motor 92, as of the internal combustion type, may be mounted on the rear bogie assembly R and is adapted to pump liquid inwardly or outwardly through a line 93, into or out of tank W through a pipe 94, which connects to lower section 89 at a T 95, and a pipe 96, which extends from T 95 to an L 97, in turn connecting with tank section 90.

It will be understood that a trailer constructed in accordance with this invention may be utilized as a flat bed, through a platform placed on the horizontal portions of the beams, and supported by shock absorbers spaced apart in a manner similar to that shown in FIGS. 1 and 5. In each instance, the load-carrying means is supported by the shock absorbers spaced so that the stresses transmitted to the load-carrying means by deflection of the beams is minimized, while the cambering of the beam reduces initial deflection. As will be evident, a series of shock absorbers of the same size may be utilized.

From the foregoing, it will be evident that a trailer has been provided which fulfills the objects and requirements of this invention to a marked degree. Thus, a trailer has been provided which has shock absorbers spaced to minimize the transmission of stresses due to deflection of the supporting beams to the load-carrying means, such as a hopper, water tank, platform, or the like. Furthermore, the trailer is convertible, in that it may be used for a variety of load-carrying members, such as hoppers, flatbeds or water tanks. In addition, when the beams are cambered, they have an initial upward deflection; thus, when the trailer is loaded, the downward deflection, in most instances, will be no greater than the upward deflection, to minimize the total amount of deflection which must be absorbed by the shock absorbers.

Although two preferred embodiments of this invention have been illustrated and described, it will be understood that other embodiments may exist and that various changes and variations may be made, all without departing from the spirit and scope of this invention.

What is claimed is:
1. A trailer adapted to be pulled behind a tractor or the like comprising:
    a pair of longitudinally extending, laterally spaced beams, each having an upright web having a maximum height along a predetermined, load carrying portion extending both forwardly and rearwardly from the longitudinal center thereof, and decreasing in height both forwardly and rearwardly from said load carrying portion, a top lateral flange attached to the upper edge of said web and a bottom flange attached to the lower edge of said web, the upper edges of the load carrying portion of each said beam having an upward camber, the center of said load carrying portion under no load conditions being above the uncambered horizontal line of said load carrying portion, in an amount such that the center will deflect downwardly under full load to below said horizontal line;
    a first and second series of longitudinally spaced beams extending transversely between the lower portions of said longitudinal beams, respectively forwardly and rearwardly from said load carrying portion;
    a series of shock absorbers mounted on the top flange of each longitudinal beam along said load carrying portion, said shock absorbers being spaced at increasing distances apart from the center to the front of said load carrying portion and at increasing distances apart from the center to the rear of said load carrying portion;
    load carrying means mounted on and supported by said shock absorbers;
    means for attachment of the front end of said trailer to said tractor for supporting said front end; and
    a rear wheel assembly mounted under and supporting the rear end of said trailer.
2. A trailer as set forth in claim 1, wherein said load carrying means comprises a dual hopper having front and rear sections provided with discharge doors at the bottom thereof;
    a transverse beam is disposed immediately forwardly and also immediately rearwardly of said hopper; and
    at least one shock absorber for supporting said hopper is mounted on each said beam immediately forwardly and rearwardly of said hopper.
3. A trailer as set forth in claim 1, wherein said load carrying means comprises a liquid tank having means attached to the sides thereof for support by said shock absorbers.
4. A trailer as set forth in claim 1, wherein said load carrying means comprises a liquid tank having means attached to the sides thereof for support by said shock absorbers and having front and rear lower portions below the tops of said longitudinal beams, with a central space between said lower portions; and
    at least one transverse beam extends within said space and between said longitudinal beams.
5. In a trailer adapted to be pulled behind a tractor or the like:
    a pair of longitudinally extending, laterally spaced beams, each having an upright web and upper and lower flanges;
    means transversely joining said beams;
    shock absorbers mounted on the upper flanges of each of said beams and spaced at distances apart which increase, both forwardly and rearwardly, from the center of said beams;

load carrying means supported by said shock absorbers, said shock absorbers minimizing transmission of stresses to said load carrying means due to flexing of said beams when said load carrying means is loaded; and the load carrying portion of the upper edge of the web of each beam being cambered upwardly.

6. In a trailer adapted to be pulled behind a tractor or the like:
 a pair of longitudinally extending, laterally spaced beams, each having an upright web and upper and lower flanges;
 a plurality of longitudinally spaced, transverse beams joining said longitudinal beams, including transverse beams at the center of said trailer connected between at least the upper portions of said longitudinal beams;
 shock absorbers mounted on the upper flanges of each of said beams and spaced at distances apart which increase, both forwardly and rearwardly, from the center of said beams; and
 a load carrying, dual hopper supported by said shock absorbers and having downwardly extending hopper sections disposed forwardly and rearwardly of said center transverse beams, said shock absorbers minimizing transmission of stresses to said load carrying means due to flexing of said beams when said load carrying means is loaded.

7. In a trailer adapted to be pulled behind a tractor or the like:
 a pair of longitudinally extending, laterally spaced beams, each having an upright web and upper and lower flanges;
 a plurality of longitudinally spaced, transverse beams joining said longitudinal beams;
 shock absorbers mounted on the upper flanges of each of said beams and spaced at distances apart which increase, both forwardly and rearwardly, from the center of said beams;
 a load carrying hopper having vertical upper side walls and also downwardly and inwardly extending side walls below said upper walls disposed inwardly of said longitudinal beams at said longitudinal beams;
 a laterally extending supporting member for said hopper at each side, resting on said shock absorbers; and
 an apron extending upwardly from the outer edge of each upper flange of a longitudinal beam to the corresponding upper side wall, said apron having a series of access holes therein above the positions of said shock absorbers.

8. In a trailer adapted to be pulled behind a tractor or the like:
 a pair of longitudinally extending, laterally spaced beams, each having an upright web and upper and lower flanges;
 at least four shock absorbers mounted on the upper flanges of each of said beams and spaced at distances apart which increase, both forwardly and rearwardly, from the center of said beams;
 load carrying means supported by said shock absorbers, said shock absorbers minimizing transmission of stresses to said load carrying means due to flexing of said beams when said load carrying means is loaded;
 a transverse beam extending transversely between said longitudinal beams, both immediately forwardly and immediately rearwardly of said load carrying means; and
 at least one shock absorber mounted on each transverse beam for supporting said load carrying means.

References Cited by the Examiner
UNITED STATES PATENTS

| | | | |
|---|---|---|---|
| 2,075,844 | 4/1937 | Goldsmith. | |
| 2,261,860 | 11/1941 | Saives | 296—35 |
| 2,306,119 | 12/1942 | Parker | 296—35 |
| 2,616,758 | 11/1952 | Meyers | 298—8 X |
| 3,064,988 | 11/1962 | Rogers | 296—35 |
| 3,088,774 | 5/1963 | Bernstein | 298—27 |
| 3,177,032 | 4/1965 | Jaskowiak | 296—35 |

BENJAMIN HERSH, *Primary Examiner.*

R. J. JOHNSON, *Assistant Examiner.*